(12) United States Patent
Huang et al.

(10) Patent No.: US 6,755,581 B1
(45) Date of Patent: Jun. 29, 2004

(54) FOLDABLE KEYBOARD

(75) Inventors: Wen-Pin Huang, Taipei Hsien (TW);
Chiu-Ho Yang, Taipei Hsien (TW);
Yu-Chu Tang, Taipei Hsien (TW)

(73) Assignee: Chi Cony Electronics Co., Ltd., Taipei Hsien (TW)

( * ) Notice: Subject to any disclaimer, the term of this patent is extended or adjusted under 35 U.S.C. 154(b) by 0 days.

(21) Appl. No.: 10/439,011

(22) Filed: May 16, 2003

(51) Int. Cl.[7] .................................................. B41J 5/10
(52) U.S. Cl. ........................................ 400/472; 400/691
(58) Field of Search ............................. 400/472, 691, 400/490, 693, 690.4; 341/22, 21; 361/680; 345/145 R, 169, 168; 200/5 R, 512, 52 R; 235/145 R, 145 A, 146; 364/189, 709.12

(56) References Cited

U.S. PATENT DOCUMENTS

| 5,457,453 A | * | 10/1995 | Chiu et al. | 341/22 |
| 5,574,481 A | * | 11/1996 | Lee | 345/168 |
| 5,653,543 A | * | 8/1997 | Abe | 400/489 |
| 6,028,768 A | * | 2/2000 | Cipolla | 361/687 |
| 6,151,012 A | * | 11/2000 | Bullister | 345/168 |
| 6,547,463 B1 | * | 4/2003 | Loo | 400/472 |
| 2002/0033761 A1 | * | 3/2002 | Katakami et al. | 341/22 |
| 2003/0002900 A1 | * | 1/2003 | Lin | 400/472 |

* cited by examiner

Primary Examiner—Anthony H. Nguyen
(74) Attorney, Agent, or Firm—Arent Fox, PLLC

(57) ABSTRACT

The present invention relates to a foldable keyboard comprising a left base plate, a right base plate, and a link shaft. Each of the base plates has a side pivotally connecting to the link shaft, enabling the base plates to expand and fold. The invention is characterized in that a first keypad secured on the left base plate; a second keypad glidingly mounted on the right base plate, and at least a linkage mechanism with a first pivot joint, a second pivot joint, and a third pivot joint; whereby the first, second, and third pivot joints are pivotally connected to the left base plate, the link shaft, and the second keypad respectively, allowing the linkage mechanism to pull the second keypad close to the first keypad when the left and right base plates are expanded horizontally; and when the left and right base plates are folded, the linkage mechanism pushes the second keypad away from the first keypad.

5 Claims, 5 Drawing Sheets

FOLDABLE KEYBOARD

BACKGROUND OF THE INVENTION

1. Field of the Invention

The present invention relates to a type of foldable keyboard. Specifically, a foldable keyboard that can be separated or adjacently in continuum closed to two sets of keypad.

2. Description of the Prior Art

According to the Republic of China patent application No. 467321, a type of foldable keyboard comprises of a first base plate, a second base plate, and a linkage mechanism. The first base plate and the second base plate both contain a plurality of keys. The linkage mechanism is composed of either two parallel connecting rods or a stab-like link. The two sides of the linkage mechanism pivotally connect to the first base plate and the second base plate separately. When the foldable keyboard unfolds, the first base plate, the second base plate, and the linkage mechanism must be expanded on the same level and pushed in by applying an external force to the two base plates. Similarly, an external force must be applied to separate the two base plates before the keyboard can be folded.

SUMMARY OF THE INVENTION

Based on the prior art, an external force must be applied to expand or fold the foldable keyboard instead of simply opening and closing the first and second base plates directly. Current techniques cannot provide a solution for convenient operation.

The primary objective of the invention is to provide a type of foldable keyboard that allows a linkage mechanism to separate or adjacently close two sets of keypad when folded or expanded.

Another objective of the invention is to improve the linkage mechanism of a foldable keyboard in order to provide an easy folding or expanding operation. This saves users the hassle of applying external force to fold or separate the two sets of keypad.

The foldable keyboard of the invention comprises of a left base plate, a right base plate, and a link shaft. One side of the left base plate and the right base plate are pivotally connected to the link shaft, allowing the two plates to be folded. The features are: a first keypad fixed on the left base plate; a second keypad glidingly mounted on the right base plate; and at least one linkage mechanism with a first pivot joint, a second pivot joint, and a third pivot joint are pivotally connected to the left base plate, the link shaft, and the second keypad respectively. The linkage mechanism pulls the second keypad close to the first keypad when the left and right base plates are expanded horizontally. On the other hand, the linkage mechanism pushes the second keypad away from the first keypad when the left and right base plates are folded together.

Therefore, based on the foldable keyboard described in this invention, the user is able to expand or fold the keyboard conveniently by two separate keypads installed on an improved link shaft.

DETAILED DESCRIPTION OF THE PREFERRED EMBODIMENTS

Figure 1:
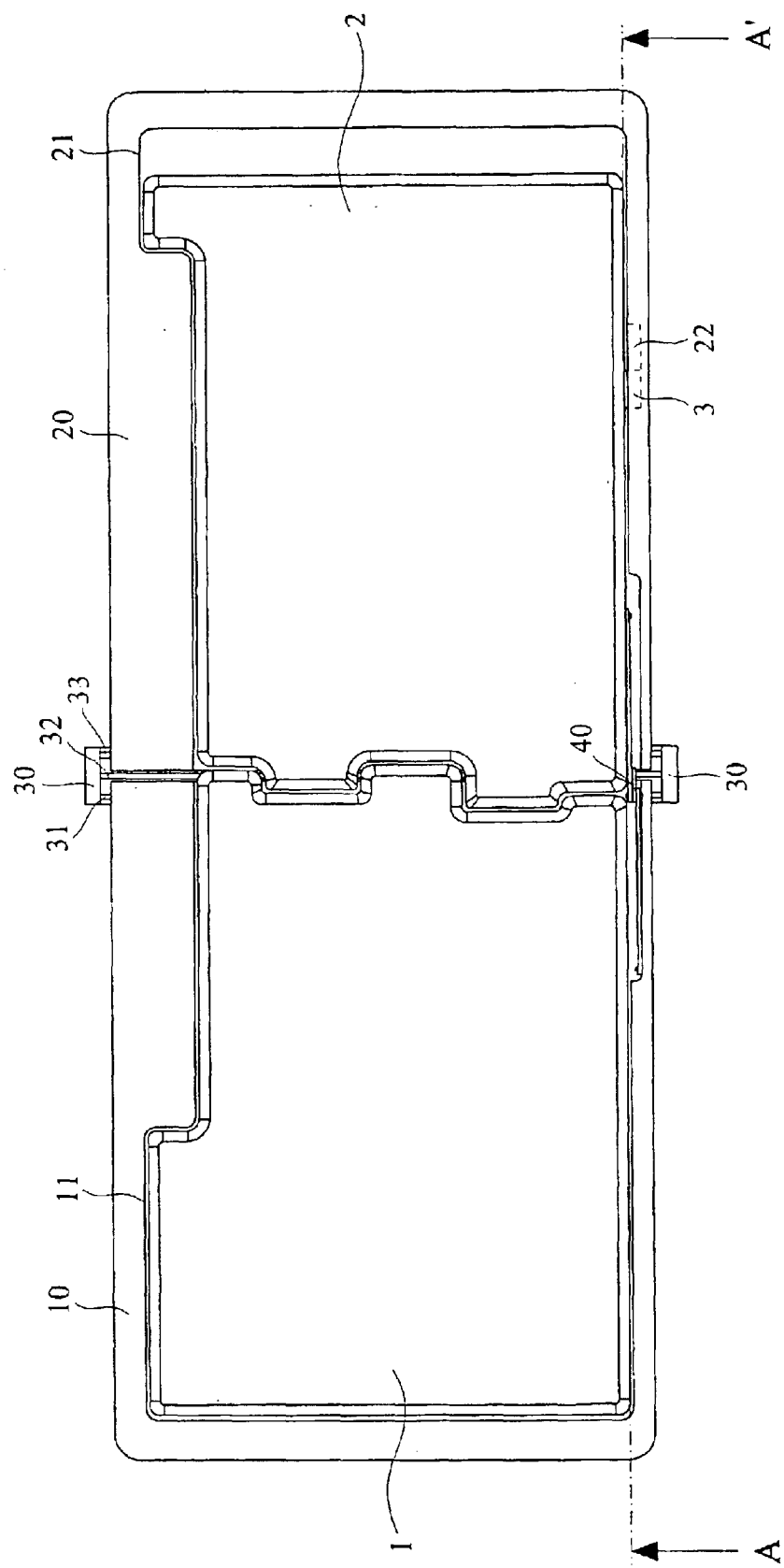
FIG. 1 is a top view of the foldable keyboard when expanded.

Please refer to FIG. 1 for a top view of the foldable keyboard when expanded. According to an embodiment of the invention, the foldable keyboard comprising a left base plate 10, a right base plate 20, and a link shaft 30. The link shaft 30 consists of a first axle rod 31, a second axle rod 32, and a third axle rod 33. One side of the left base plate 10 is pivotally connected to the first axle rod 31 and one side of the right base plate 20 is pivotally connected to the third axle rod 33. This enables the left and right base plates 20, 30 to rotate on the first and third axle rods 31, 33 respectively so as to meet and joint to each other. The second axle rod 32 is placed in between the first and third axle rods 31, 33 in order to strengthen the structure of the link shaft 30. In addition, the left and the right keypad locations 11, 21 are placed on the left and right base plates 10, 20 respectively. When the left and right base plates are folded together, the corresponding edges on both plates match closely with a hollow space in between. The hollow space in the center is capable of storing two sets of keypad.

Continuing on FIG. 1, the foldable keyboard further comprising a first keypad 1 with a plurality of keys fixed in the indented left keypad location 11 on the left base plate 11; a second sliding keypad 2 with a plurality of keys installed in the slightly larger right keypad location 21 on the right base plate 20 wherein the keypad is able to slide in a restricted distance; and at least one linkage mechanism 40 with a first pivot joint 411, a second pivot joint 421, and a third pivot joint 431 pivotally connected to the left base plate 10 or the suitable location on the edge of the first keypad 1, the axle rod 30, and suitable location on the edge of the second keypad 2 respectively. The linkage mechanism 40 pulls the second keypad 2 adjacently connected to the first keypad 1 closely when the left and right base plates 10, 20 are expanded horizontally. On the other hand, the linkage mechanism 40 pushes the second keypad 2 away from the first keypad 1 when the left and right base plates 10, 20 are folded together.

Furthermore, in order to maintain the movement of the second keypad 2 within the right keypad location 21, a bump 3 can be added at a suitable position along the edge. Also, a guide slot 22 can be installed on the corresponding edge of the bump 3 to help the second keypad 2 slide freely within the right keypad location 21. While this embodiment has been described, it is to be understood that various modifications may be made as will be apparent to those skilled in the art.

Figure 2:
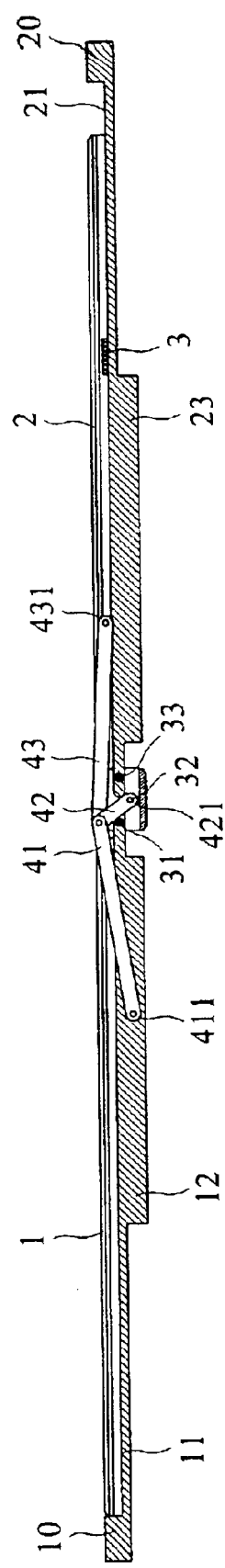
FIG. 2 is a cross-sectional view of the foldable keyboard from A–A' line in FIG. 1.
Figure 3:
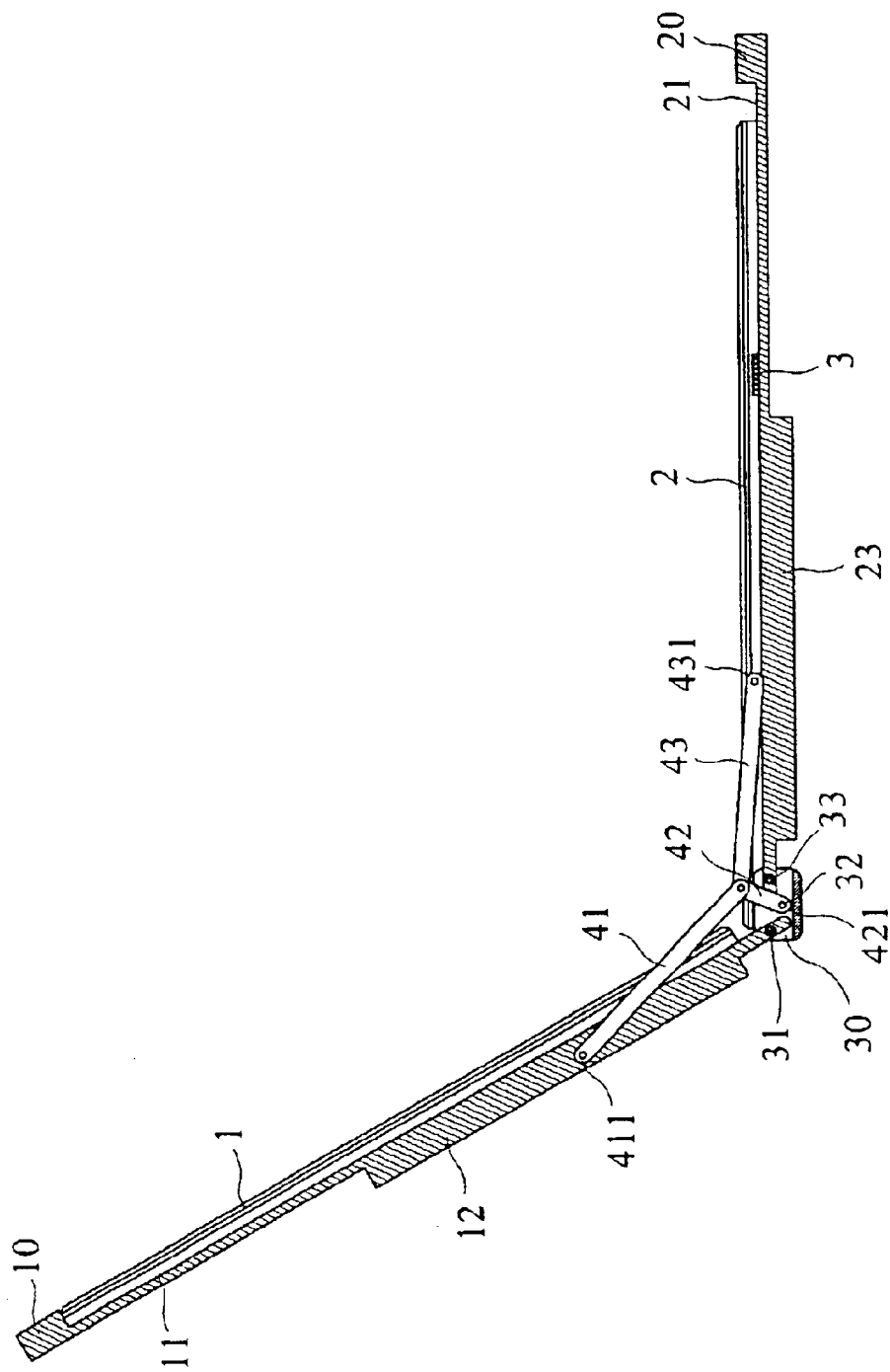
FIG. 3 is a cross-sectional view of the foldable keyboard when the left base plate is folded clockwise at 30 degrees.
Figure 4:
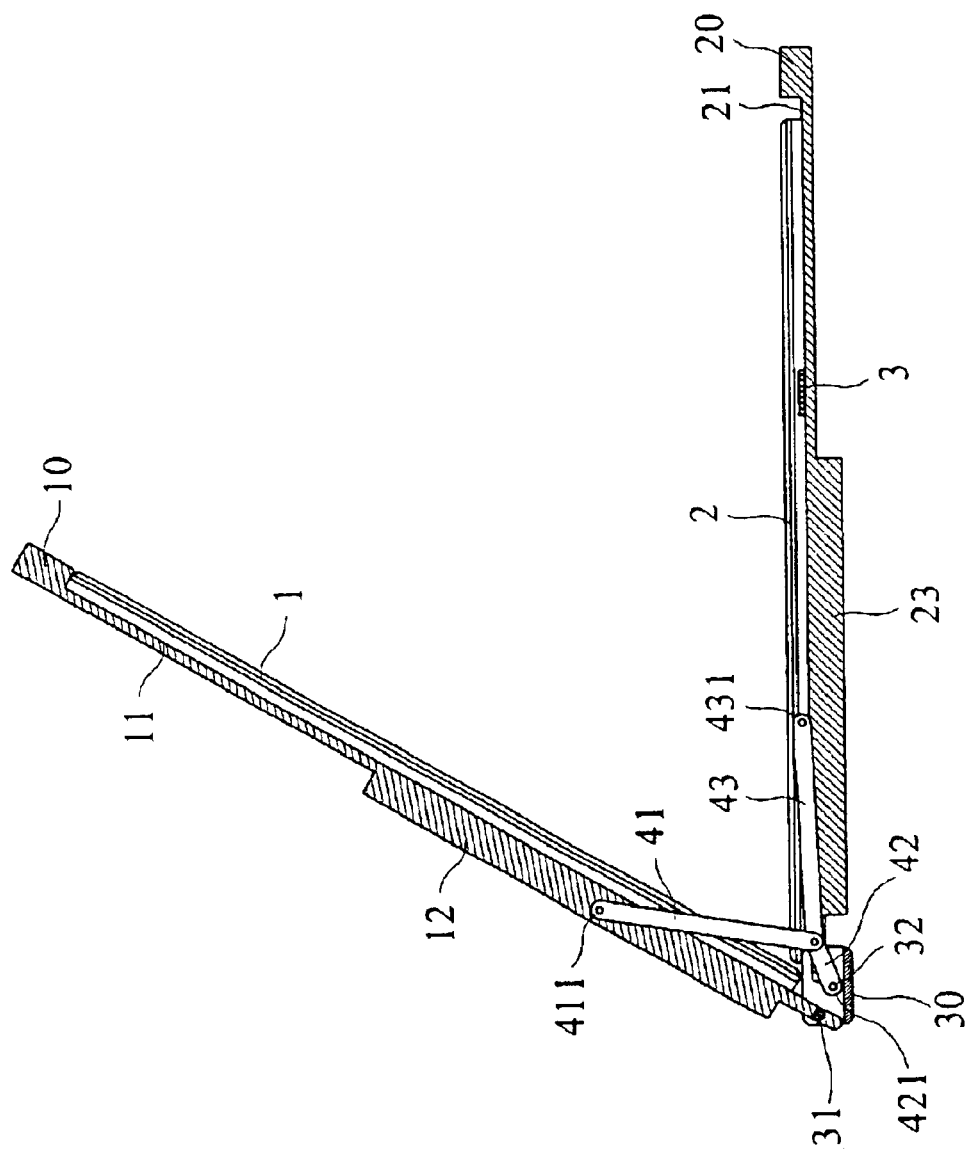
FIG. 4 is a cross-sectional view of the foldable keyboard when the left base plate is folded clockwise at 120 degrees.
Figure 5:
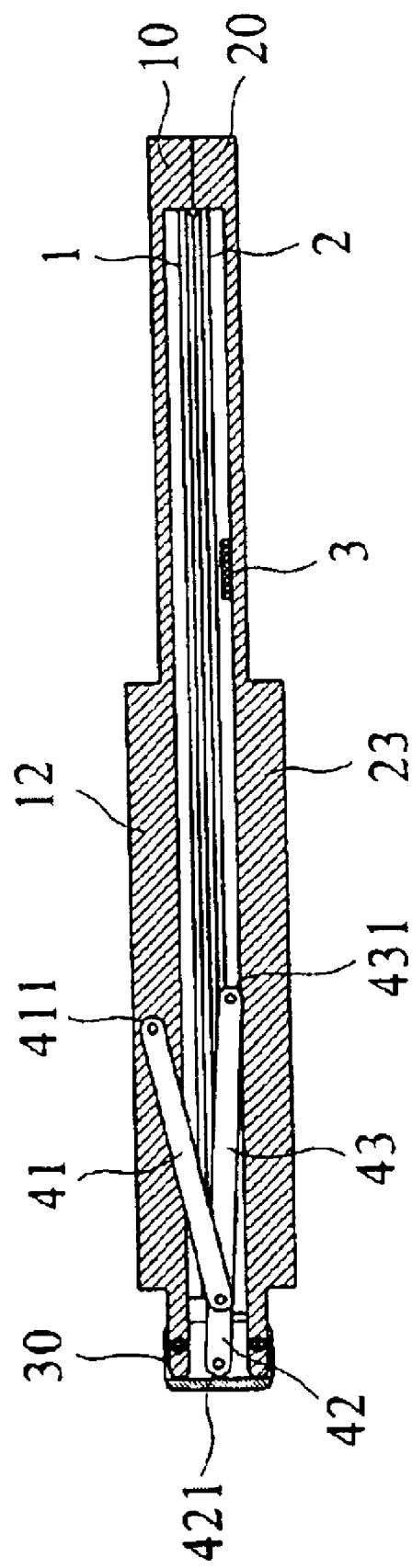
FIG. 5 is a cross-sectional view of the foldable keyboard when the left base plate is folded completely onto the right base plate.

Please refer to FIG. 2 for a cross sectional view of the foldable keyboard from A–A' line in FIG. 1 when expanded. In one of the embodiment of the invention, the linkage mechanism 40 comprises of a first connecting rod 41, a second connecting rod 42, and a third connecting rod 43. The length of the second connecting rod 42 is shorter than the length of the first and the third connecting rods 41, 43. Each of the connecting rods 41, 42, 43 has one common joint end that is shared and connected to one another. The other ends of the connecting rods 41, 42, 43 are the first pivot joint 411, the second pivot joint 421, and the third pivot joint 431 respectively. The three pivot joints 411, 421, 431 are further connected to the left base plate 10, the second axle rod 32 of the link shaft 30, and the edge of the second keypad 2 respectively. These connections enable the foldable keyboard to fold as shown in continuum from FIG. 2 to FIG. 5. The first connecting rod 41 will push the second and third connecting rods 42, 43 when the left base plate 10 is being folded. Then, the third connecting rod 43 pushes the second keypad 2 away from the first keypad 1. Conversely, when the foldable keyboard expands as shown in continuum from FIG. 5 to FIG. 2, the first connecting rod 41 will pull the second and third connecting rods 42, 43 along with the movement of the left base plate 10. This causes the third connecting rod 43 to pull the second keypad 2 glidingly close to the first keypad 1.

Continuing on FIG. 2, one of the characteristics of the invention is that part of the right keypad location 21 will expose when the first keypad 1 and the second keypad 2 are expanded. The first keypad 1 and the second keypad 2 can be combined into an operational keyboard. Additionally, a left foundation 12 and a right foundation 23 under the left and right base plates 10, 20 will provide balance support to the keyboard. This allows the foldable keyboard to be placed firmly when the left foundation 12, the right foundation 23, and the link shaft 30 are expanded horizontally.

What is claimed is:

1. A foldable keyboard, comprising a left base plate, a right base plate, and a link shaft wherein one side of the left and right base plates are pivotally connected to the link shaft enabling the left and right base plates to fold and expand, characterized in which:

a first keypad fixed on the left base plate;

a second keypad glidingly installed on the right base plate; and at least a linkage mechanism with a first pivot joint, a second pivot joint, and a third pivot joint, the first, second, and third pivot joints are connected to the left base plate, the link shaft, and the second keypad respectively, wherein the linkage mechanism pulls the second keypad adjacently closed to the first keypad when the left and right base plates are expanded, and the linkage mechanism pushes the second keypad away from the first keypad when the left and right base plates are folded, and wherein said linkage mechanism comprises of three connecting rods with one common end and the other ends being the first pivot joint, the second pivot joint, and the third pivot joint respectively; whereby when the foldable keyboard is expanded, the connecting rod on the left base plate pulls other connecting rods to cause the second keypad to slid ably close to the first keypad; and when the foldable keyboard is folded, the connecting rod on the left base plate pushes other connecting rods away to make the second keypad slid ably away from the first keypad.

2. A foldable keyboard, comprising a left base plate, a right base plate, and a link shaft wherein one side of the left and right base plates are pivotally connected to the link shaft enabling the left and right base plates to fold and expand, characterized in which:

a first keypad fixed on the left base plate;

a second keypad glidingly installed on the right base plate; and at least a linkage mechanism with a first pivot joint, a second pivot joint, and a third pivot joint, the first, second, and third pivot joints are connected to the left base plate, the link shaft, and the second keypad respectively;

wherein the linkage mechanism pulls the second keypad adjacently closed to the first keypad when the left and right base plates are expanded, and the linkage mechanism pushes the second keypad away from the first keypad when the left and right base plates are folded, wherein said linkage mechanism comprises of a first rod, a second rod, and a third rod, and wherein the length of said second rod is shorter than the length of said first and third rods.

3. A foldable keyboard, comprising a left base plate, a right base plate, and a link shaft wherein one side of the left and right base plates are pivotally connected to the link shaft enabling the left and right base plates to fold and expand, characterized in which:

a first keypad fixed on the left base plate;

a second keypad glidingly installed on the right base plate; and at least a linkage mechanism with a first pivot joint, a second pivot joint, and a third pivot joint, the first, second, and third pivot joints are connected to the left base plate, the link shaft, and the second keypad respectively, wherein the linkage mechanism pulls the second keypad adjacently closed to the first keypad when the left and right base plates are expanded, and the linkage mechanism pushes the second keypad away from the first keypad when the left and right base plates are folded, wherein said linkage mechanism comprises of a first rod, a second rod, and a third rod, and wherein said first, second, and third rods have one common joint end and other ends being said first pivot joint, said second pivot joint, and said third pivot joint respectively.

4. A foldable keyboard, comprising a left base plate, a right base plate, and a link shaft wherein one side of the left and right base plates are pivotally connected to the link shaft enabling the left and right base plates to fold and expand, characterized in which:

a first keypad fixed on the left base plate;

a second keypad glidingly installed on the right base plate; and at least a linkage mechanism with a first pivot joint, a second pivot joint, and a third pivot joint, the first, second, and third pivot joints are connected to the left base plate, the link shaft, and the second keypad respectively, wherein the linkage mechanism pulls the second keypad adjacently closed to the first keypad when the left and right base plates are expanded; and the linkage mechanism pushes the second keypad away from the first keypad when the left and right base plates are folded, wherein said linkage mechanism comprises of a first rod, a second rod, and a third rod, wherein said first, second, and third rods have one common joint end and other ends being said first pivot joint, said second pivot joint, and said third pivot joint respectively, and wherein when the foldable keyboard is folded, said first connecting rod pushes the second and third connecting rods, then the third rod further pushes the second keypad glidingly away from the first keypad.

5. A foldable keyboard, comprising a left base plate, a right base plate, and a link shaft wherein one side of the left and right base plates are pivotally connected to the link shaft enabling the left and right base plates to fold and expand, characterized in which:

a first keypad fixed on the left base plate;

a second keypad glidingly installed on the right base plate; and at least a linkage mechanism with a first pivot joint, a second pivot joint, and a third pivot joint, the first, second, and third pivot joints are connected to the left base plate, the link shaft, and the second keypad respectively;

wherein the linkage mechanism pulls the second keypad adjacently closed to the first keypad when the left and right base plates are expanded, and the linkage mechanism pushes the second keypad away from the first keypad when the left and right base plates are folded, wherein said linkage mechanism comprises of a first rod, a second rod, and a third rod, wherein said first, second, and third rods have one common joint end and other ends being said first pivot joint, said second pivot joint, and said third pivot joint respectively, and wherein when the foldable keyboard is expanded, said first connecting rod pulls the second and third rods, then the third rod further pulls the second keypad close to the first keypad.

\* \* \* \* \*